Dec. 5, 1967  P. B. FONDÉN ETAL  3,356,039
DEVICE FOR SWITCH IN TRACK SYSTEM
Filed June 1, 1965  4 Sheets-Sheet 1
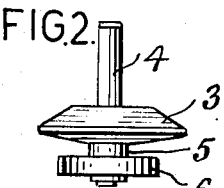
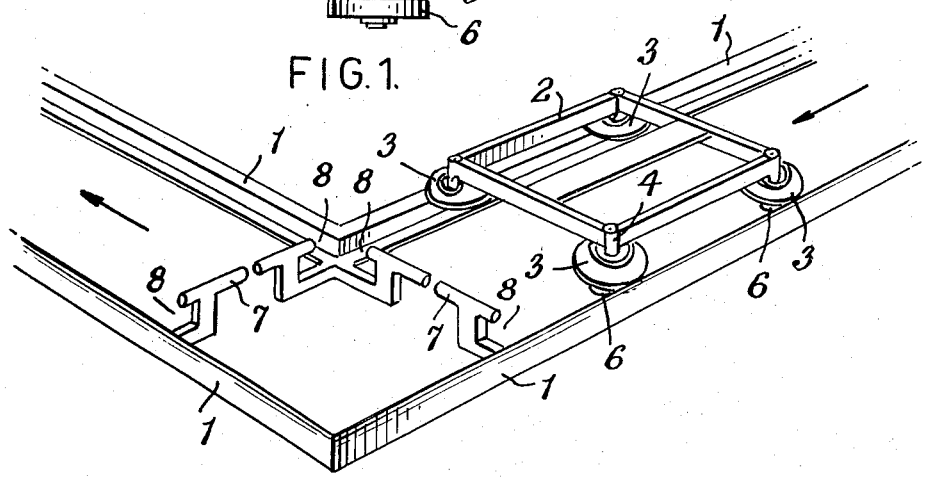
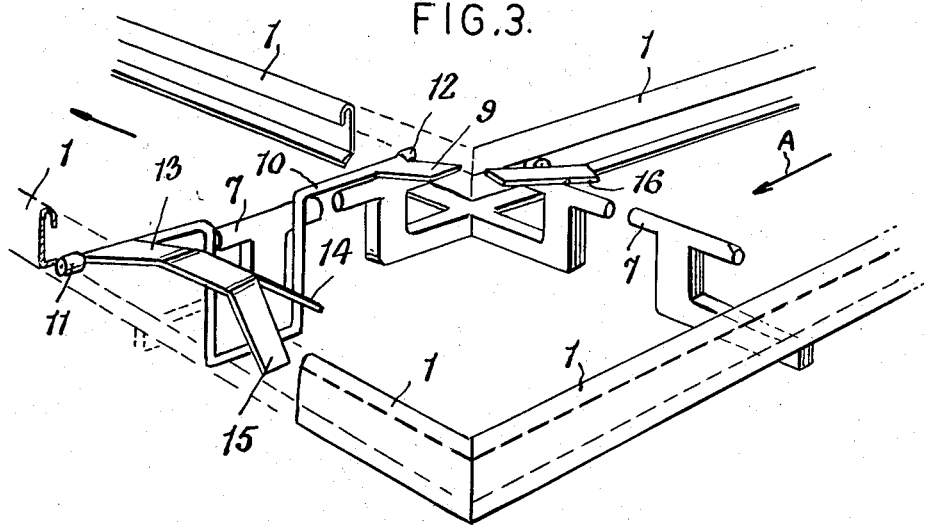
INVENTORS:-
Per Börje Fondén &
Sture Bertil Mattsson
BY
*Attorney*

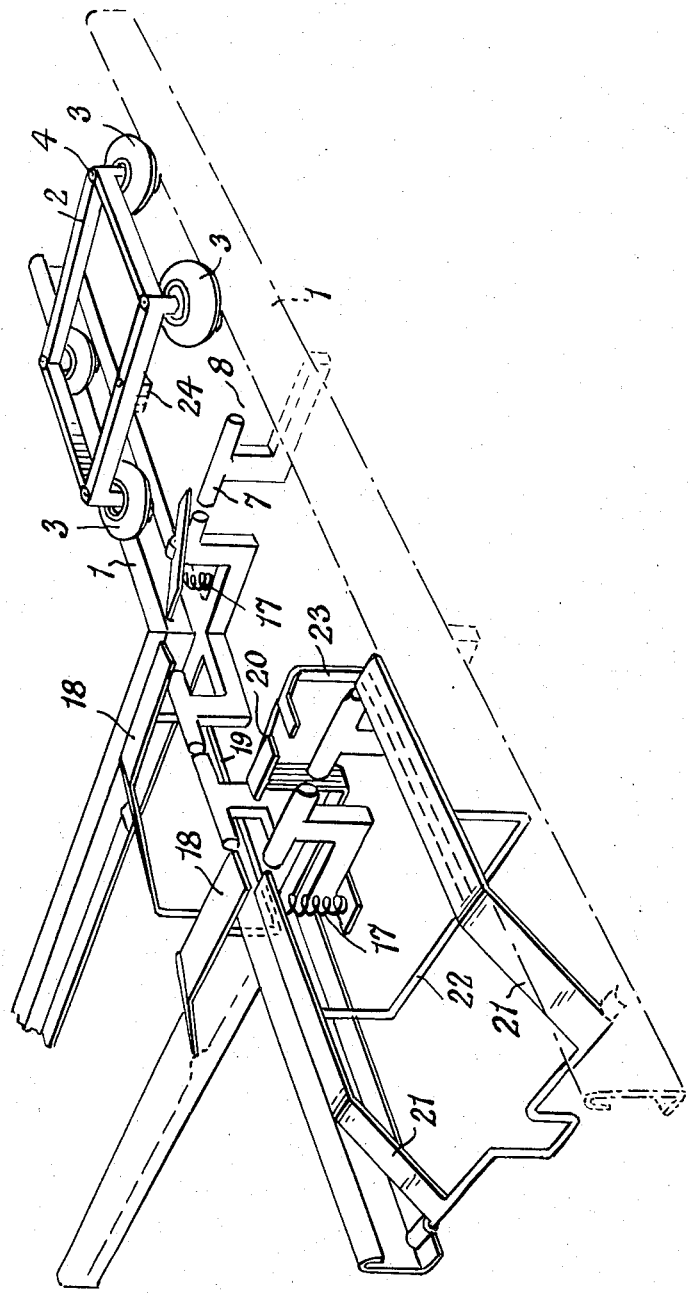

Dec. 5, 1967  P. B. FONDÉN ET AL  3,356,039
DEVICE FOR SWITCH IN TRACK SYSTEM
Filed June 1, 1965  4 Sheets-Sheet 3
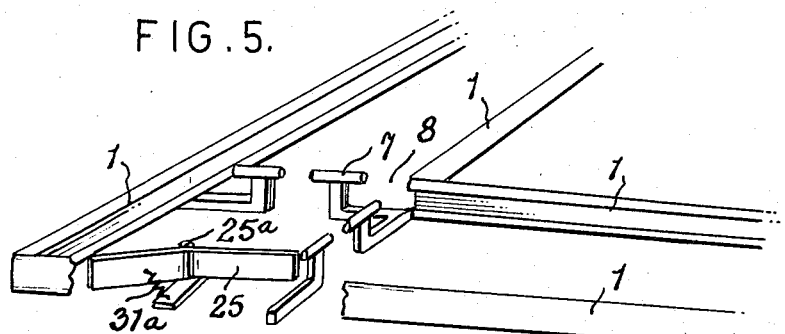
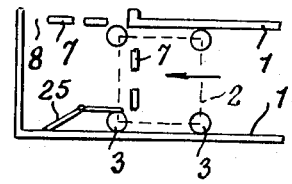
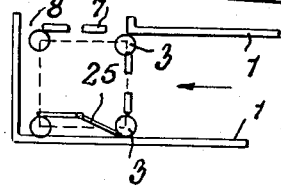
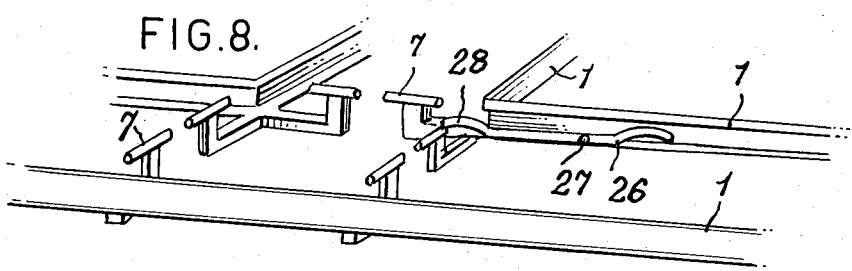
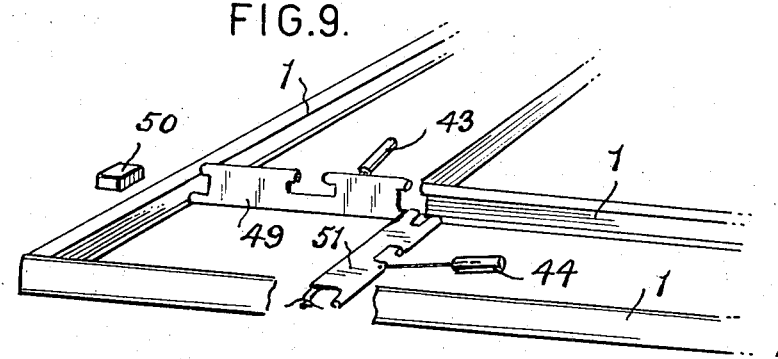
INVENTORS
Per Börje Fondén &
Sture Bertil Mattsson
BY
*Attorney*

INVENTORS:
Per Börje Fondén &
Sture Bertil Mattsson

United States Patent Office 3,356,039
Patented Dec. 5, 1967

3,356,039
DEVICE FOR SWITCH IN TRACK SYSTEM
Per Börje Fondén, Linkoping, and Sture Bertil Mattsson, Norrkoping, Sweden, assignors to Borgs Fabriks AB, Norrkoping, Sweden
Filed June 1, 1965, Ser. No. 460,362
6 Claims. (Cl. 104—130)

ABSTRACT OF THE DISCLOSURE

A switching means for trucks which move on tracks and particularly to a type of truck that is provided with wheels that rotate on axles that are arranged at right angles to the plane of the tracks. The switching means contemplates the provision of devices which permit the transfer of a truck, without rotative movement of the truck body, from one track section to a right angle extension of the track. Such devices include adjustable barriers located at interruptions in the track. These barriers provide for the free passage of the truck when they are not positioned for action and when positioned for action they are arranged to permit the transfer of the truck to the angular track extension without requiring rotative bodily movement of the truck and without the possibility of causing derailment of the truck.

---

This invention relates to a device for a switch in a track system for trucks with wheels which rotate on shafts that are, for the most part, aligned at right angles to the plane of the tracks, and which switch device is used to transfer a truck from one track section to another which crosses it at an angle, or to a branch track; the track being interrupted at the switch to enable the wheels to transfer from one track section to another.

The invention is chiefly characterized in that one or more interruptions or switching locations, adjustable barriers are provided which, when positioned for action, act to prevent the wheels from derailing at the interruption and when not positioned for operation leave a free passage for the wheels during switching.

It is therefore an object of the invention to provide an efficient means by which a shunting or switching of a truck will be effectively accomplished with the possibility of derailment being prevented.

With these and other objects to be hereinafter set forth in view, I have devised the arrangement of parts to be described and more particularly pointed out in the claims appended hereto.

In the accompanying drawings, wherein an illustrative embodiment of the invention is disclosed, FIG. 1 is a perspective view of an L-shaped track of the type in which the present improvements are used;

FIG. 2 shows one of the wheels of the truck;

FIG. 3 shows a track similar to that of FIG. 1 and to which the barriers have been applied;

FIG. 4 shows a track provided with an adjoining branch and also provided with the improved barrier means;

FIG. 5 shows a track provided with another type of barrier;

FIGS. 6 and 7 show the manner of operation of the barrier shown in FIG. 5;

FIG. 8 shows a track to which another form of barrier is applied;

FIG. 9 shows a track provided with foldable rail sections;

Figure 10:
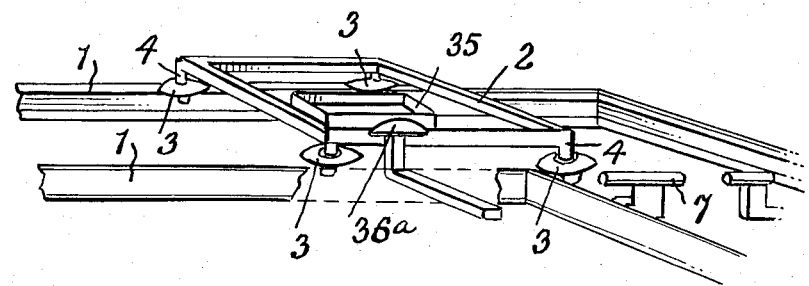
FIG. 10 shows how derailing can be prevented by means of a cam engaging with guides fitted to a truck.

In FIG. 1 is shown an L-shaped track 1 with a truck 2 having running wheels 3 with shafts 4 which are disposed at right angles to the plane of the track. As shown in FIG. 2, the wheel 3 is provided with a downwardly-directed guide pin 5 which suitably supports a radial bearing 6. This provides for reliable steering of the truck on the track.

As is seen in FIG. 1 the truck 2 can change direction by 90 degrees without rotating around a vertical axis. The switch to secure such a change in direction is provided with bars 7 having interruptions or gaps 8 for the passage of the wheels. This involves some risk of derailing when the truck is in such a position that the far wheel of the forward pair of wheels on the truck is directly opposite the interruption or gap 8 which, with the truck in its final position ready for switching, is intended to be passed through by the far wheel in the rear pair of wheels.

In previous structures efforts were made to reduce the risk of derailment by making a certain part of the bar section 7 movable so that only one opening can occur at a time at the inner corner of the angled switch. However, this requires special operation of this bar section for which certain movable parts are needed that cause a high noise level and adds to the cost and possess other disadvantages.

The present invention solves this problem without the above-mentioned disadvantages by means of a device such as is shown in FIG. 3. In this construction the opening at the inner corner can be blocked by a descending barrier 9. This barrier is borne by a U-shaped shaft 10 which is carried in two bearings 11, 12 and is actuated by a sensing device in the form of a lever 13 which has an extension 14 intended to be actuated by the front wheel on the same side of the truck when it is ready to proceed in the new direction. The lever 13 is designed so that when it is depressed by a wedging action by the front side wheel on the truck proceeding in the direction of the arrow A when said wheel reaches the position for motion deflection, said wheel which originally was one of the front wheels, becomes after the change of direction, one of the back wheels, whereupon a section 15 of the lever, is depressed by a wedging action.

Thus the truck is fully steered until it reaches the correct position for change of direction, whereupon the lever rod 10, and thus barrier 9 is depressed at the rear wheel, and in the new direction of movement, both the front wheel and the rear wheel will pass this barrier without difficulty.

The shaft 10 is shown as being U-shaped in shape. This makes room for a drive shaft on the truck which is located between the truck wheels and is not shown on the drawing to simplify illustration. If it is expected that truck travel in the opposite direction to that indicated is desirable, the lever rod 10 or barrier 9 or both of these elements are designed so that they are automatically depressed in this direction of travel also. In addition, a corresponding design is also provided for the interruptions in the bars which, in the first case, provided for entry, but now provide for departure from the switch.

If it is expected that only a single direction of travel will be required, these barriers can be so arranged as the flap-barrier 16 in FIG. 3. The barriers are kept in the blocking position by means of the spring 17, FIG. 4. In FIG. 3 these springs have not been shown for clarity.

FIG. 4 shows a corresponding device for a T-switch where the truck can alternately continue straight forward on the track or turn onto the side track whereupon the barrier 18 operates to prevent derailing when the front wheel finds itself at the interruption or gap 8 in the bars 7 intended for the rear wheels. A corresponding situation also arises if the truck arrives from the side track and alternatively turns to the right or to the left or if the bar system provides for a complete crossing.

The preceding description included mechanical transmission via a shaft between a sensing device placed at the position of the front wheel an a barrier intended to be withdrawn only after the rear wheel is in the correct position. Both the sensing device and the transmission can, of course, be arranged in several different ways. For example an electrical contact can be used as the sensing device whereupon the barrier, for example, could comprise an iron core in a solenoid device. Thus, the above description is only one example of the use of the novelty inherent in the present invention.

Also the invention is not to be limited to the use of a sensing device which is actuated by a truck wheel; it can include some other part of the truck, for example its front edge or rear edge or an object or projection mounted on the truck especially for the purpose of actuating the sensing device which, in turn, actuates the barrier. FIG. 4 shows barriers 18 which block the interruptions leading to the side track. These barriers are, via a shaft 19, connected to a sensing device 20. Barriers 21 are, by means of the shaft 22, connected with a sensing device 23. The sensing devices are intended to be actuated by a part 24 beneath the truck and which can be adjusted laterally. If the truck is to proceed straight ahead, the part 24 is moved to the position shown in solid lines, where it will depress the sensing device 23 and thus barriers 21, while device 20 and barriers 18 will not be disturbed. If the truck is to turn onto the side track, the part 24 is moved to the position shown in broken lines where it actuates device 20 while device 23 remains undisturbed. If there are side tracks running in both directions, that is, a track crossing is involved, another carrier device is provided in which part 24 is designed so that it can be moved to three different lateral positions.

In the embodiment shown in FIGS. 5, 6 and 7, an angled plate 25 is pivoted at 25a and it guides the front wheels 6 in the manner shown in FIG. 6. In switching, the plate 25 is pivoted by one of the front wheels 3 to the position shown in FIG. 7. The truck is now ready to be switched.

In FIG. 8 is shown a lever, pivoted at 27, the lever being indicated at 26. As a truck arrives from the right, the lever, 26 is first depressed by the front wheel of the truck and then by the rear wheel whereby barrier 28 prevents the front wheels from derailing at the gap. A free passage for switching is again obtained when the rear wheel has passed the lever 26.

In FIG. 9 the track is shown as being provided with folding rail sections. No gaps are needed in this construction. As a valve 50 is actuated by a truck arriving from the right, a piston from 44 forces the section 51 of the track upwards to vertical position, following which the piston from valve 43 lowers the section 59. The truck can now be driven onto the new track.

FIG. 10 shows how derailment can be prevented by means of a cam 36a which engages with a guide 35 fitted on a truck.

Figure 11:
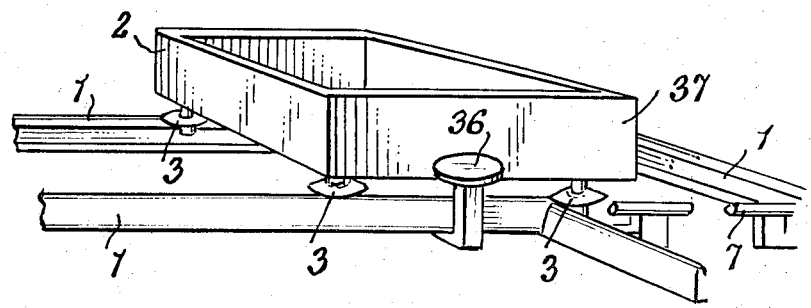
FIG. 11 shows how a disk contacting with a side panel on the truck can prevent derailment.

FIG. 11 shows a disk 36 making contact with a side panel 37 on the truck and preventing derailment in this manner.

Figure 12:
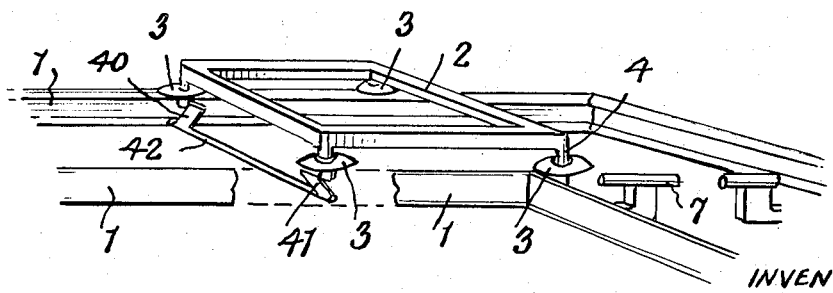
FIG. 12 shows how a shaft provided with barriers which grip the wheels of the truck will prevent the truck from turning.

FIG. 12 shows a rotative shaft 42 provided with radially and oppositely-directed barriers 40 and 41 which, in the position illustrated grip the rear wheels from opposite sides of the same in such a way that the truck is kept from turning; that is the front wheel directly opposite the gap is prevented from derailing. When continuing its movement to the right, the truck leaves the device 37, 39 which is rotatively moved.

Having thus described embodiments of the invention, it is obvious that the same is not to be restricted thereto, but is broad enough to cover all structures coming within the scope of the annexed claims.

What we claim is:

1. A device for use at a switching location for trucks borne on wheels having shafts disposed at right angles to the plane of the tracks on which the trucks move, the tracks including a branch section to which the truck is to be switched, the tracks being interrupted, to permit the wheels to transfer from one main track section to a branch section, the branch being disposed at right angles to the main track section, steering means in the form of adjustable barriers which when positioned for action at the track interruptions, deter the wheels from derailment at the interruptions and when not positioned for action leave a free passage for the wheels through the interruptions.

2. A device according to claim 1, wherein the barriers are so arranged that by means of sensing devices they are lowered by the action of the truck when it passes the position at which there is risk of derailing.

3. A device according to claim 1, characterized in that one or more interruptions are provided with rotatable flap barriers which prevent the truck from moving backward from a switch.

4. A device for use at a switching location for trucks riding on tracks, the tracks having gaps through which wheel parts on a truck pass when a truck is being switched from one main track section to a branch track at right angles to the main track section, pivoted flap elements normally closing the gaps at the entrance to the branch track, sensing means attached to said flap elements and in position to be engaged by parts of the truck when the truck reaches a position at the entrance to the right angle branch track, whereby said flap elements will be moved to non-blocking position and permit the truck to have its wheel parts moved through the gaps when the truck is moved into the branch track without causing bodily rotative movement of the truck.

5. A device for use at a switching location for trucks riding on tracks, the tracks having gaps through which wheel parts on a truck pass when the truck is being switched from a track to a branch thereof, and cam means engaging against side surfaces on the truck to prevent rotative movement of the truck around a vertical axis as the truck is moved to a switching position at the entrance to the branch.

6. A device according to claim 5, wherein said cam means consists of a disk contacting a side panel on the truck.

References Cited

UNITED STATES PATENTS

| 522,096 | 6/1894 | Bachelder | 246—347 |
| 640,586 | 1/1900 | Phelps | 246—347 |
| 1,089,903 | 3/1914 | Cobb | 246—320 |
| 1,288,222 | 12/1918 | Schmidt | 246—378 X |
| 2,623,759 | 12/1952 | Forbas | 104—252 X |
| 3,094,941 | 6/1963 | Hellner | 104—130 |
| 3,098,454 | 7/1963 | Maestrelli | 104—130 X |
| 3,131,799 | 5/1964 | Ribeton | 193—35 |
| 3,176,828 | 4/1965 | Sullivan | 193—35 X |

FOREIGN PATENTS

| 621,342 | 4/1927 | France. |
| 24,906 | 11/1911 | Great Britain. |

ARTHUR L. LA POINT, *Primary Examiner.*

J. E. BABER, *Assistant Examiner.*